US008576690B2

(12) United States Patent
Pierrugues et al.

(10) Patent No.: US 8,576,690 B2
(45) Date of Patent: Nov. 5, 2013

(54) SYSTEMS AND METHODS FOR IMPLEMENTING A MULTI-SENSOR RECEIVER IN A DSM3 ENVIRONMENT

(75) Inventors: Laurent Pierrugues, Tinton Falls, NJ (US); Laurent Francis Alloin, Monmouth Beach, NJ (US); Amitkumar Mahadevan, Freehold, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 262 days.

(21) Appl. No.: 13/051,906

(22) Filed: Mar. 18, 2011

(65) Prior Publication Data
US 2011/0235759 A1 Sep. 29, 2011

Related U.S. Application Data

(60) Provisional application No. 61/316,606, filed on Mar. 23, 2010.

(51) Int. Cl.
*H04J 1/12* (2006.01)
(52) U.S. Cl.
USPC .......................................................... 370/201
(58) Field of Classification Search
None
See application file for complete search history.

(56) References Cited

U.S. PATENT DOCUMENTS

| | | | |
|---|---|---|---|
| 6,839,429 B1 | 1/2005 | Gaikwad et al. | |
| 6,999,504 B1* | 2/2006 | Amrany et al. | 375/222 |
| 7,577,084 B2 | 8/2009 | Tang et al. | |
| 2008/0049855 A1* | 2/2008 | Duvaut et al. | 375/260 |
| 2008/0291989 A1 | 11/2008 | Ashikhmin et al. | |
| 2009/0073867 A1 | 3/2009 | Schenk | |
| 2009/0122855 A1 | 5/2009 | Duvaut et al. | |
| 2010/0046738 A1 | 2/2010 | Schelstraete et al. | |

OTHER PUBLICATIONS

PCT International Search Report and Written Opinion in co-pending related PCT Application No. PCT/US2011/029295 mailed May 12, 2011.

* cited by examiner

*Primary Examiner* — Minh-Trang Nguyen
(74) *Attorney, Agent, or Firm* — Mark J. Danielson; Pillsbury Winthrop Shaw Pittman LLP

(57) ABSTRACT

In accordance with one embodiment, a method is implemented in a vectored system for improving a signal-to-noise ratio (SNR) of a far end transmitted signal on a victim line in the system. The method comprises mitigating, by the vectored system, self-induced far-end crosstalk (self-FEXT) on the victim line based on self-FEXT mitigation coefficients and receiving, by a second sensor, information relating to at least one of: self-FEXT of the vectored system, external noise, and the far end transmitted signal. The method further comprises learning, at the second sensor, coefficients relating to self-FEXT coupling into the second sensor and removing self-FEXT from the second sensor based on the learned coefficients. Upon removal of self-FEXT from the second sensor, a linear combiner configured to combine information relating to the victim line and the second line is learned. The method further comprises applying the learned linear combiner and readjusting the self-FEXT mitigation coefficients to remove any residual self-FEXT on the victim line after application of the learned linear combiner.

41 Claims, 8 Drawing Sheets

SYSTEMS AND METHODS FOR IMPLEMENTING A MULTI-SENSOR RECEIVER IN A DSM3 ENVIRONMENT

CROSS-REFERENCE TO RELATED APPLICATION

This application claims priority to, and the benefit of, U.S. Provisional patent application entitled, "Dual Sensor Xtalk Canceller in a DSM3 Environment," having Ser. No. 61/316,606, filed on Mar. 23, 2010, which is incorporated by reference in its entirety.

TECHNICAL FIELD

The present disclosure generally relates to digital subscriber line systems and particularly, to implementation of dual sensor crosstalk cancellation.

BACKGROUND

Digital subscriber line (xDSL) technology has developed in recent years in response to the demand for high-speed Internet access. xDSL technology utilizes the communication medium of pre-existing telephone systems. Thus, both plain old telephone systems (POTS) and xDSL systems share a common line for xDSL-compatible customer premises. Similarly, other services such as time compression multiplexing (TCM) integrated services digital network (ISDN) can also share a common line with xDSL and POTS.

Allocations of wire pairs within telephone cables in accordance with service requests have typically resulted in a random distribution of pair utilization with few precise records of actual configurations. Because of the physical proximity of bundled cables (due to pair twisting, cable branching, cable splicing, etc.), crosstalk caused by the electromagnetic interference between the neighboring lines is often the dominating noise source in the transmission environment. In addition, due to pair twisting in cables where cable branching and splicing take place, a wire pair can be in close proximity to many different pairs spanning different portions of its length. At a telephone CO (central office), pairs in close proximity may carry diverse types of service using various modulation schemes, with considerable differences in signal levels (and receiver sensitivities) especially for pairs of considerably different lengths.

There are generally two types of crosstalk mechanisms that are characterized, one being FEXT and the other one being near-end crosstalk (NEXT). FEXT refers to electromagnetic coupling that occurs when the receiver on a disturbed pair is located at the far end of the communication line as the transmitter of a disturbing pair. Self induced far end crosstalk (self-FEXT) generally refers to interference caused by neighboring lines provisioned for the same type of service as the affected line, or "victim line." In contrast, NEXT results from a disturbing source connected at one end of the wire pair which causes interference in the message channel at the same end as the disturbing source. Current approaches to addressing crosstalk suffer from various perceived shortcomings. While vectored systems are effective in addressing such disturbances as self-FEXT, various types of interferences such as radio frequency interference (RFI), power line communications (PLC), common mode noise, and impulse nose remain an issue.

SUMMARY

Various embodiments are described. One embodiment is a method implemented in a vectored system for improving a signal-to-noise ratio (SNR) of a far end transmitted signal on a victim line in the system. The method comprises mitigating, by the vectored system, self-induced far-end crosstalk (self-FEXT) on the victim line based on self-FEXT mitigation coefficients and receiving, by a second sensor, information relating to at least one of: self-FEXT of the vectored system, external noise, and the far end transmitted signal. The method further comprises learning, at the second sensor, coefficients relating to self-FEXT coupling into the second sensor and removing self-FEXT from the second sensor based on the learned coefficients. Upon removal of self-FEXT from the second sensor, a linear combiner configured to combine information relating to the victim line and the second line is learned. The method further comprises applying the learned linear combiner and readjusting the self-FEXT mitigation coefficients to remove any residual self-FEXT on the victim line after application of the learned linear combiner.

In accordance with another embodiment, a method for improving a signal-to-noise ratio (SNR) of a far end transmitted signal on a victim line in a system, comprises receiving, by the victim line, at least one of: self-induced far-end crosstalk (self-FEXT) of the vectored system, external noise, and the far end transmitted signal and receiving, by a second sensor, at least one of: self-FEXT of the vectored system, external noise, and the far end transmitted signal. The method further comprises learning, at the victim line, coefficients relating to self-FEXT coupling into the main line, wherein learning is performed based on known training mode sequences transmitted in the system and learning, at the second sensor, coefficients relating to self-FEXT coupling into the second sensor, wherein learning is performed based on known training mode sequences transmitted in the system. The method further comprises removing, at the victim line, self-FEXT from the main line based on the learned coefficients and removing, at the second sensor, self-FEXT from the second sensor based on the learned coefficients. A linear combiner is learned upon removing self-FEXT from both the main line and the second sensor, the linear combiner configured to combine information relating to the victim line and the second sensor. The method further comprises applying the learned linear combiner and learning the self FEXT mitigation coefficients and performing noise mitigation on the victim line to remove self-FEXT on the victim line.

Another embodiment is a vectored system configured to improve a signal-to-noise ratio (SNR) of a far end transmitted signal on a victim line, comprising a far end crosstalk (FEXT) mitigator configured to mitigate self-induced far-end crosstalk (self-FEXT) on the victim line based on self-FEXT mitigation coefficients, a first sensor coupled to the victim line, and a second sensor, the second sensor configured to receive information relating to at least to one of: the vectored system, external noise, and the far end transmitted signal on the victim line. The second sensor is further configured to learn coefficients relating to self-FEXT coupling into the second sensor and remove self-FEXT based on the learned coefficients. The system further comprises a linear combiner configured to undergo learning upon removal of self-FEXT from the second sensor, wherein the linear combiner is configured to combine information relating to the victim line and the second line, wherein the FEXT mitigator is further configured to readjust the self-FEXT mitigation coefficients to remove any residual self-FEXT on the victim line after application of the learned linear combiner.

Another embodiment is a method implemented in customer premises equipment (CPE) for improving a signal-to-noise ratio (SNR) of a far end transmitted signal on a victim line. The method comprises receiving, by the victim line, one or more of: the far end transmitted signal, self-induced far-end crosstalk (self-FEXT) of a vectored system, and external noise. The method further comprises receiving, by a second sensor, one or more of: the far end transmitted signal, self-induced far-end crosstalk (self-FEXT) of a vectored system, and external noise. Based on the presence of self-FEXT, coefficients relating to self-FEXT coupling into the victim line at learned at the victim line. The method further comprises learning, at the second sensor, coefficients relating to self-FEXT coupling into the second sensor. Responsive to the presence of self-FEXT, self-FEXT is removed from the victim line based on the learned coefficients. Self-FEXT is removed from the second sensor based on the learned coefficients. Upon removal of self-FEXT from the second sensor, a linear combiner configured to combine information relating to the victim line and the second line is learned. The method further comprise applying the learned linear combiner.

Another embodiment is a customer premises equipment (CPE) unit in a vectored system for improving a signal-to-noise ratio (SNR) of a far end transmitted signal on a victim line. The CPE comprises a first sensor coupled to the victim line, the first sensor configured to learn coefficients relating to self-induced far-end crosstalk (self-FEXT) coupling into the first sensor and remove self-FEXT based on the learned coefficients. The CPE further comprises a second sensor configured to receive information relating to at least one of: the vectored system, external noise, and the far end transmitted signal on the victim line, the second sensor further configured to learn coefficients relating to self-FEXT coupling into the second sensor and remove self-FEXT based on the learned coefficients. The CPE further comprises a linear combiner configured to undergo learning upon removal of self-FEXT from the first and the second sensor, wherein the linear combiner is configured to combine information relating to the victim line and the second line.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
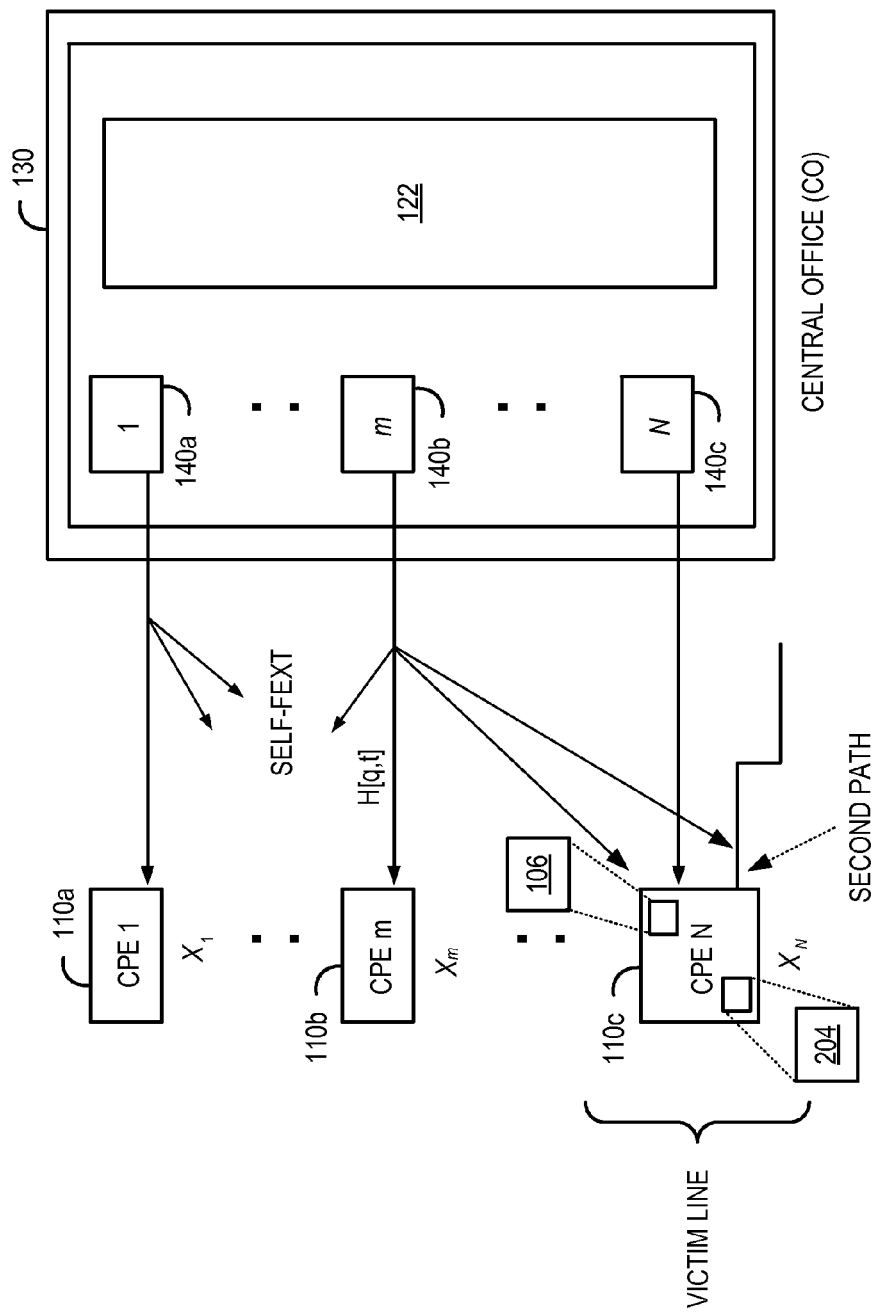
FIG. 1 depicts a communication system in which embodiments of a dual sensor configuration are implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Various embodiments are disclosed related to the use of a second sensor at the receiver in a vectoring environment, where the receiver is either implemented at the central office (CO) or at the customer premises equipment (CPE). In accordance with some embodiments, a second sensor is used with a noise canceller when the information captured by the second sensor relates to noise. The second sensor may also be used in the context of a diversity receiver when the information carried by the second sensor is related to useful transmit information. It should be further emphasized that the second sensor may also be used when the information received by the sensor relates to an external noise and a useful signal. Embodiments of a dual sensor receiver are described with respect to an alien noise canceller located at the customer premises equipment (CPE) for the downstream data path. Note, however, that the concepts described can be extended to a diversity receiver or any other type of joint receiver configuration based on a second sensor. The concepts can also be extended to the upstream path where the receiver is located on the CO side. Finally, it should also be noted that the concepts relating to one sensor and one victim line can also be extended to apply to multiple victim lines and multiple sensors used by a same receiver. In this regard, variations and modifications may be made to the embodiments described herein without departing from the principles of the present disclosure.

In very high speed digital subscriber line (VDSL) systems, crosstalk is generally a large concern. While near end crosstalk (NEXT) tends to be negligible by construction, self induced far-end crosstalk (self-FEXT) is typically the dominant large band noise in VDSL systems. Nevertheless, self-FEXT has been addressed by introducing vectoring solutions across bundles. Reference is made to FIG. 1, which illustrates a communication system in a vectoring environment. One vectoring method, for example, relates to reducing self-induced far end crosstalk (self-FEXT) in a multiple input multiple output (MIMO) digital subscriber line (xDSL) system.

As VDSL2 systems generally share a same twisted pair cable bundle, self-FEXT noise can be mitigated. For the upstream direction, self-FEXT mitigation is performed through a per tone joint canceller at the central office (CO) in the frequency domain before or after the frequency equalizer (FEQ). Additional details regarding self-FEXT noise mitigation techniques can be found in U.S. Pat. No. 7,835,368, filed on May 20, 2008, entitled "System and Method for Mitigating the Effects of Upstream Far-End Cross-Talk," which is herein incorporated by reference in its entirety. For self-FEXT cancellation in the downstream path, the use of a joint canceller is not relevant as the customer premises equipment (CPE) are not co-located. As a result, a precoding approach is usually chosen, which means that the self-FEXT noise is cancelled at the transmitter via pre-compensation. Additional details regarding MIMO precoding in an xDSL system are described in U.S. application Ser. No. 11/845,040, filed on Aug. 25, 2007, entitled "Systems and Methods for MIMO Precoding in an xDSL System," which is also herein incorporated by reference in its entirety. For purposes of this disclosure, self-FEXT mitigation generally refers to vectoring self-FEXT noise cancellation techniques in a vectored system.

While vectored systems are effective in addressing such disturbances as self-FEXT, various types of interferences such as non-vectored VDSL2 FEXT, radio frequency interference (RFI), power line communications (PLC), common mode noise, and impulse noise remain an issue as vectoring is not effective in mitigating these disturbers. Such disturbers are generally located in the frequency spectrum, and communication systems generally experience one or two of these disturbers. When the twisted pairs share the same cable bundle, the vectoring system does not always reach optimal performance (as optimized to account for background noise) as external noise can also affect the system.

Figure 4A:
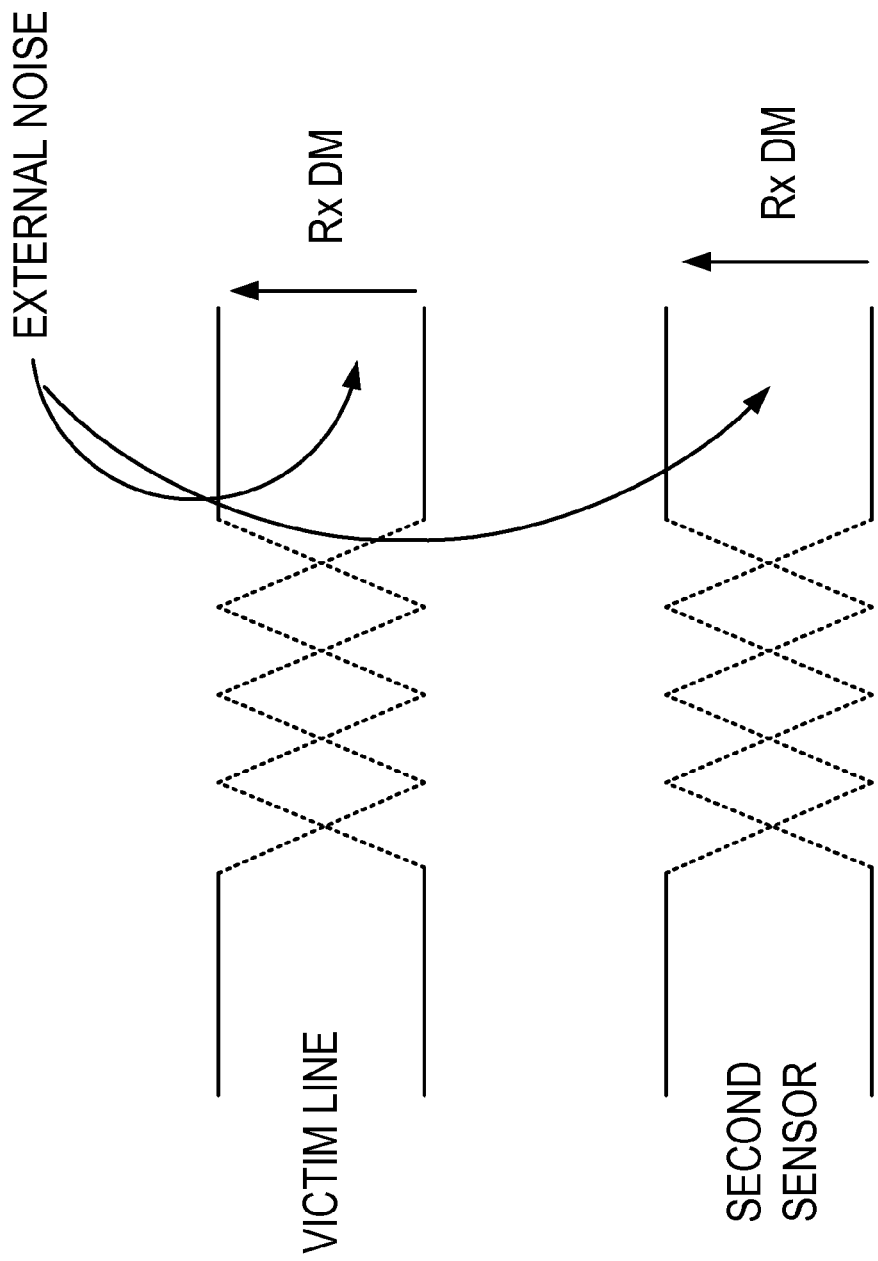
FIG. 4A depicts an embodiment of the second sensor comprising a differential mode sensor coupled to another line in the same bundle as the victim line.
Figure 4B:
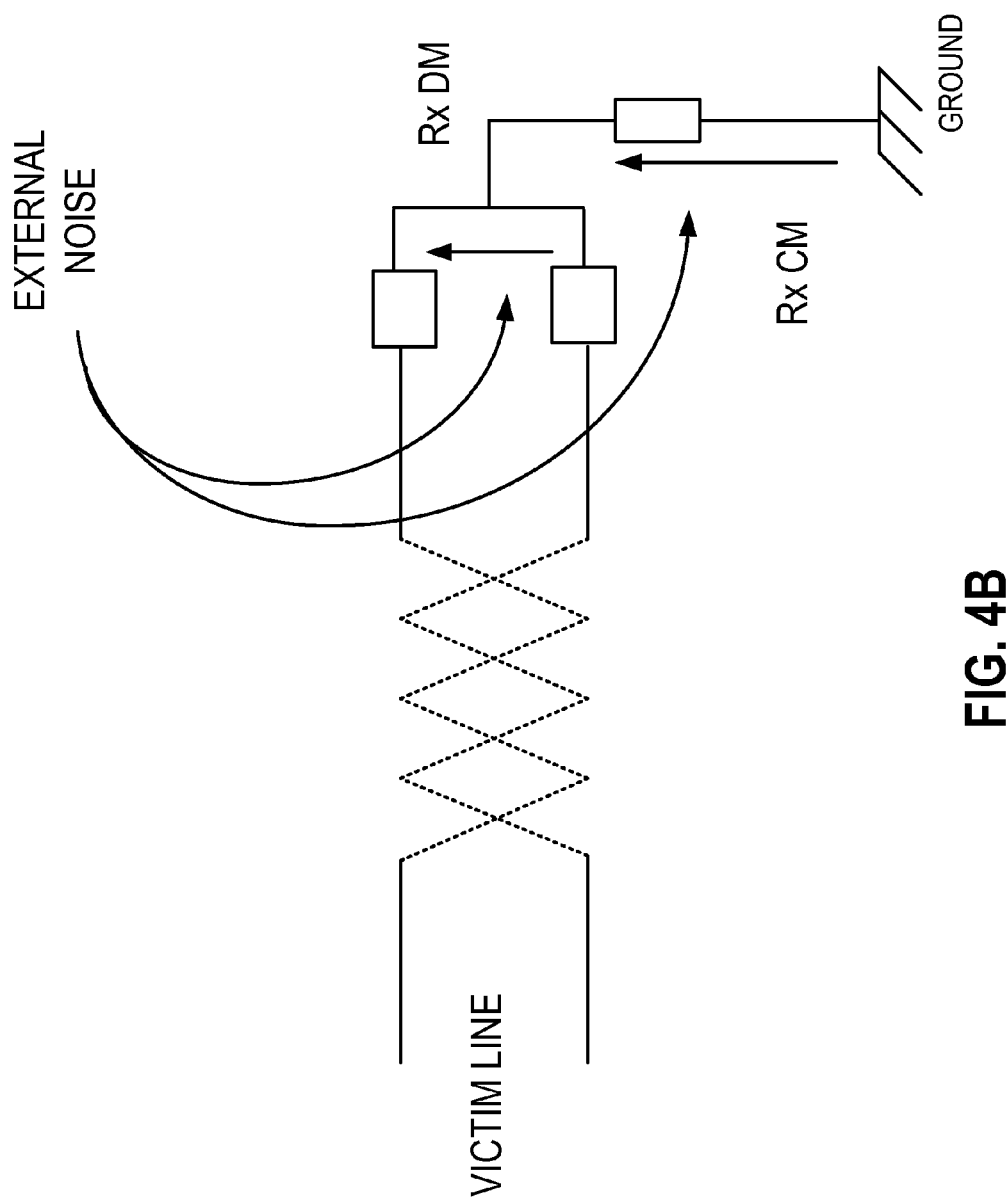
FIG. 4B depicts an alternative embodiment of the second sensor comprising a common sensor coupled between the victim line comprising a twisted pair and ground.

To cancel or compensate this type of noise, a per tone dual sensor receiver (DSR) may be used in conjunction with information received by a second sensor, where the DSR operates in the frequency domain to address alien disturbers. As noted earlier, the concepts relating to one sensor can also be extended to apply to multiple sensors used by a same receiver. It is possible to have a main, victim path and a second path both affected by the same noise synchronously. This second sensor can be, for example, a differential mode twisted pair unused line in the same bundle as the victim line or a common mode sensor. To further illustrate, reference is made to FIGS. 4A and 4B. FIG. 4A depicts a differential mode sensor coupled to another line in the same bundle as the victim line. FIG. 4B depicts a common sensor coupled between the twisted pair comprising the victim line and ground. Additional details regarding the use of a common mode signal to obtain additional information that can be used to better approximate the transmitted signal are disclosed in U.S. Pat. No. 6,999,504, filed Mar. 15, 2001, entitled "System and Method for Canceling Crosstalk," herein incorporated by reference in its entirety. One limitation with the dual sensor receiver described above is that the presence of more than one or two disturbers becomes an issue as signals begin to exhibit attributes similar to white noise, which results in reduced diversity at the receiver. This ultimately results in reduced performance. As the noise is usually located in a specific frequency spectrum, a frequency approach (or per tone after a FFT operator) is usually suggested.

Figure 3:
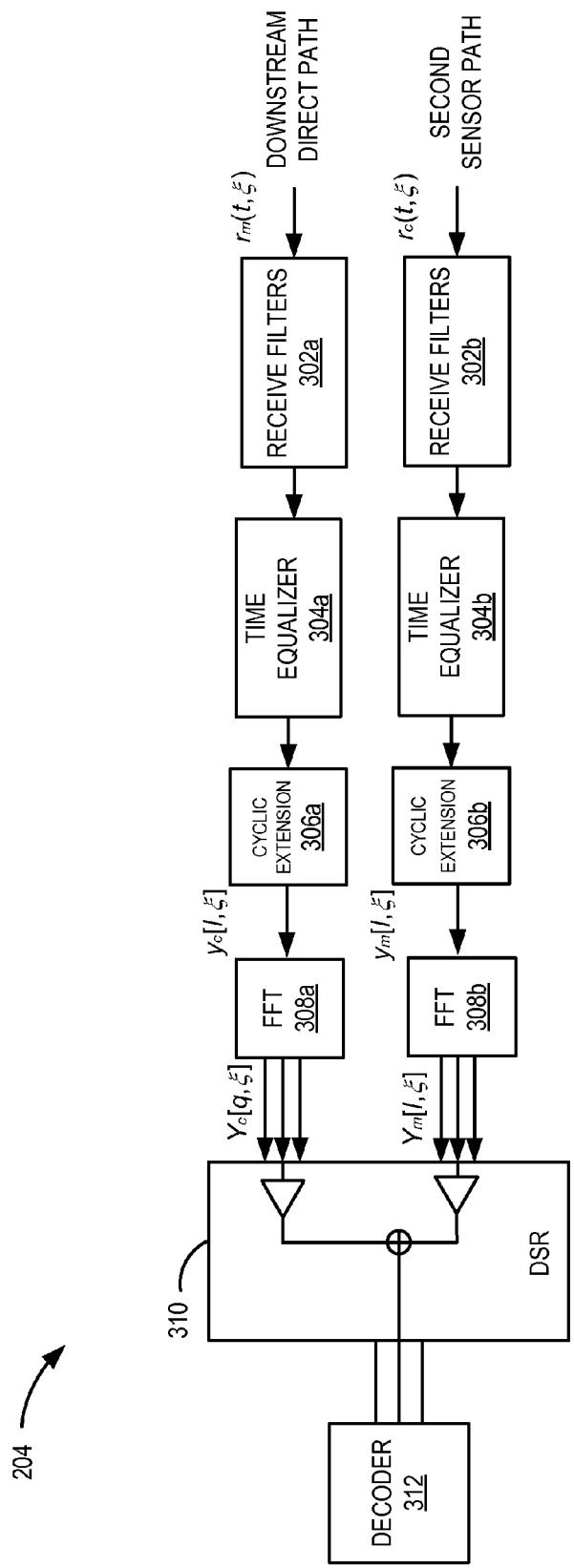
FIG. 3 is an embodiment of the receiver shown in FIG. 2.

The CPE 110 in FIG. 1 includes a FEXT mitigator 106 and a receiver 204, where the receiver 204 is configured to receive data from the transceivers 140a at the CO 130 under the self-FEXT disturbance of 140b, c. Reference is made to FIG. 3, which provides a detailed view of the receiver 204 in FIG. 1. The frequency approach described herein generally requires that the information received by a second sensor (e.g., common mode sensor) be processed in a suitable manner than the mainstream information, up to the output of the fast Fourier transform (FFT) operator. In that order, the synchronization of the data flow is conserved, and thus the correlation of the signal on the two streams is generally maintained. In some specific cases, as in the case of a diversity receiver, the time domain signals need to be desynchronized in order to maximize the signal-to-noise ratio (SNR).

As shown in FIG. 3, the receiver 204 comprises various modules. Filters 302a, 302b (e.g., analog and digital) are applied to the receive signal in order to increase the dynamic range of the receive signal in the useful frequency band. As the channel can introduce a large amount of Inter Symbol Interference (ISI), the receiver 204 further comprises a time equalizer (TEQ) 304a configured to shorten the channel impulse response to a cyclic extension length. The TEQ 304a is learned and applied to the downstream direct path. This TEQ 304a is then reproduced on the process path of the second sensor (TEQ 304b). After removing the cyclic extension on both received signals using the cyclic extension modules 306a, 306b, an FFT operation is performed by the FFT blocks 308a, 308b, and the received signal is forwarded to a dual sensor receiver (DSR) 310 and on to a decoder 312.

Figure 2:
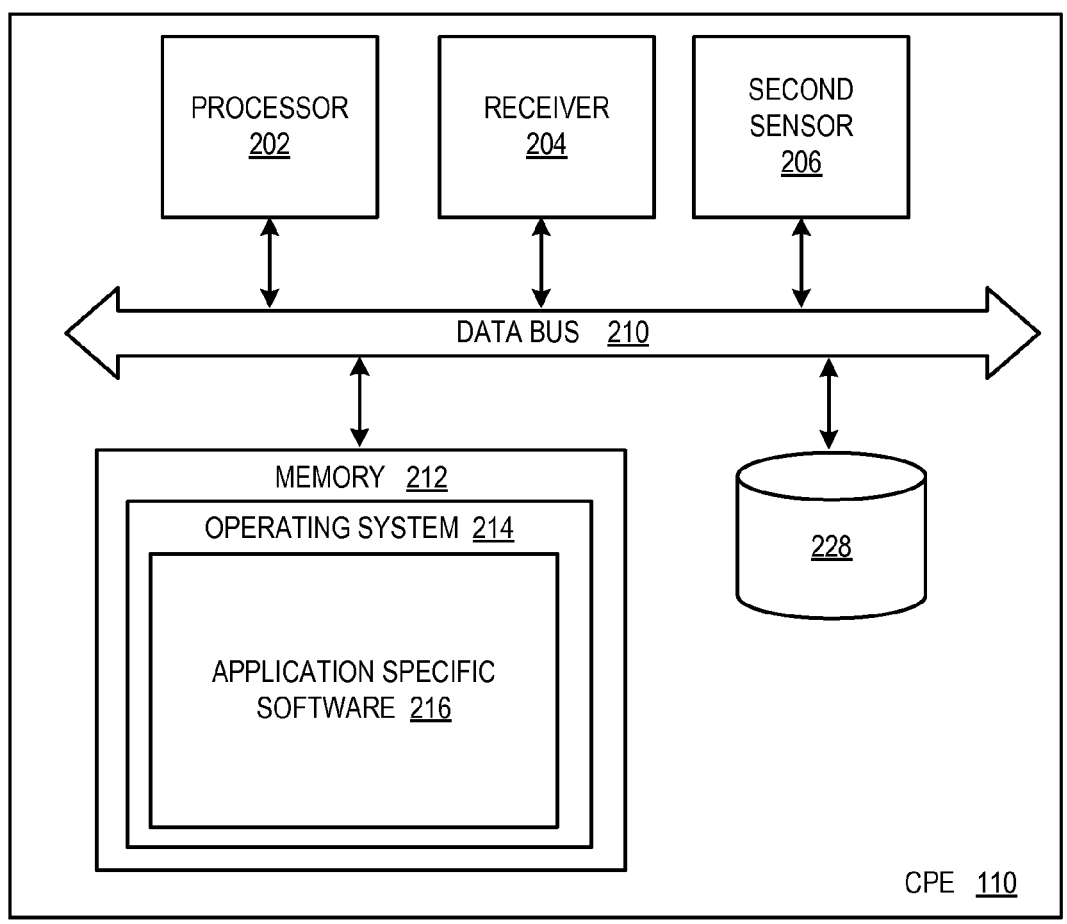
FIG. 2 is an embodiment of the CPE shown in the system of FIG. 1.

FIG. 2 depicts an embodiment of the CPE 110 in FIG. 1. In addition to a receiver 204 and a second sensor 206, the CPE 110 may also include a processor 202, a memory component 212 which may include volatile and/or nonvolatile memory components, and data storage 228 such as mass memory that are communicatively coupled via a local interface 210. The local interface 210 may include other elements such as controllers, buffers (caches), drivers, repeaters, and receivers to enable communications. Further, the local interface 210 may include address, control, and/or data connections to enable appropriate communications among the aforementioned components 202, 212, 228.

The processor 202 in the CPE 110 is configured to execute software stored on a tangible storage medium such as the memory component 212. The processor 202 can be any custom made or commercially available processor, a central processing unit (CPU), an auxiliary processor among several processors, a semiconductor based microprocessor (in the form of a microchip or chip set), a macroprocessor, or generally any device for executing software instructions. The memory component 212 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 212 may incorporate electronic, magnetic, optical, and/or other types of storage media. One should note that some embodiments of the memory component 212 can have a distributed architecture (where various components are situated remotely from one another), but can be accessed by the processor 202.

Software stored on the memory component 212 may include one or more separate programs, each of which includes an ordered listing of executable instructions for implementing logical functions. For example, the software in the memory component may include an operating system 214. Furthermore, the software residing in memory may include application specific software 216 configured to perform some or all of the functions associated with the dual sensor system described herein. It should be noted that these modules can be implemented in software, hardware or a combination of software and hardware. When implemented in software, the modules are stored on a non-transitory computer readable medium and executed by the processor 202. The operating system 214 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component, so as to operate properly in connection with the operating system.

Let the signal received by a typical VDSL2 receiver on the main, victim line be represented by:

$$Y_m[q,t]=H_m[q]\times[q,t]+S_m+W_m[q,t],$$

where the signal is in frequency domain per tone q for DMT symbol t after undergoing a fast Fourier transform (FFT) operation in the frequency domain. The term H represents the direct channel; X is the transmitted information; S represents self-FEXT noise from the vectored system; and W represents external noise such as background noise, impulse noise, PLC, and so on.

As all the lines in a vectored system are synchronized, the self-FEXT disturber can be readily identified, and in that matter, other techniques can also be used to identify the self-FEXT channel. In this regard, VDSL2 systems with vectoring engaged typically provide a self-FEXT free environment via self-FEXT mitigation In a given bundle, for example, the effects of self-FEXT can be mitigated through the precoding of data for downstream transmission to cancel self-FEXT, while in the upstream direction, joint cancellation may be deployed. The signal received on the victim line after vectoring is turned on is represented as follows:

$$Y_m[q,t]=H_m[q]\times[q,t]+W_m[q,t],$$

where Y represents the signal in the frequency domain after undergoing an FFT operation.

When external noise sources (e.g., alien noise disturbers) such as non-vectored VDSL2 FEXT, radio frequency interference (RFI), power line communications (PLC), common mode noise, and impulse noise remain, the dual sensor receiver (DSR) may be used in conjunction with a second sensor information operating in the frequency domain to address alien disturbers as described below. In the context of the alien noise canceller, the signal received by the second sensor in the frequency domain per tone q for a DMT symbol t after undergoing an FFT operation is represented by the following:

$$Y_s[q,t]=S_s+W_s[q,t]$$

The second sensor acts as a noise alone reference (NAR). The second sensor (whether a common mode sensor or a differential mode sensor) is effective in capturing information relating to the noise source. In the frequency domain, a linear combination of information relating to the receiver on the two paths (corresponding to the victim line and the second sensor) can then be used to reduce or compensate for the alien disturber, thereby improving performance. With an alien noise canceller, the signal-to-noise ratio (SNR) is maximized and the noise in the frequency domain is compensated for using a per tone algorithm. Specifically, this is performed using a per tone linear combiner optimally learned according to such criteria as minimum mean square error, zero forcing, maximum likelihood (ML), or other type of criteria. In such cases, the output information is represented as:

$$\tilde{X}[q,t]=F_m Y_m[q,t]+F_s Y_s[q,t],$$

where Y represents the received signal, and F represents the linear combiner coefficients. Note that the linear combiner is not limited to two coefficients (F) as the linear combiner can also use only one coefficient F per tone q, even on the receive signal of the victim line or the second sensor.

One limitation with the dual sensor receiver described above is that the presence of more than one or two disturbers destroys the correlation between the received signals, and which results in reduced diversity at the receiver. In the current vectoring system scenario, the second sensor is not free of self-FEXT by construction. Thus, one issue with utilizing a second sensor here is that the second sensor will not only experience such disturbances as RFI and PCL but also the effects of self-FEXT which have not been compensated for by the precoder and which could be the most powerful received signal, thereby diminishing the properties of a noise alone reference (NAR). This leads to poor performance, and in general, no noise cancellation.

Various embodiments are thus described for utilizing a DSR in conjunction with a second sensor whereby self-FEXT on the second sensor is removed so that the information can be effectively utilized during the per tone linear combiner training. It is possible to locally remove the component related to the self-FEXT on the second sensor for specific received sequences in training mode and in data mode on DMT symbols referred to as sync symbols. In fact, sync symbols are known training DMT symbols that occur in data mode every 257 symbols and during which, by using an orthogonal key such as a Hadamard sequence, for example, every user of the vectoring system has a signature. In that specific context, it is possible to estimate at the receiver the contribution from the self-FEXT of every transmitter and as a consequence, mitigate the self-FEXT. This technique serves as the basis of the vectoring system as mentioned earlier. Note that on top of the sync symbol, decision-directed techniques (using data mode symbols) for estimating the self-FEXT mitigation coefficients can also be used when all the receivers are co-located, which is typically the case at the CO. In that context and based on local knowledge at the CPE of each key sequence of the vectoring system (for example, known by default by the CPE or transmitted by the CO in proprietary fields), the receiver can remove the contribution of the self-FEXT from the second sensor:

$$\tilde{Y}_s[q,t]=Y_s[q,t]-\tilde{S}_s=W_s[q,t],$$

where $\tilde{S}$ is the estimate of the self-FEXT in the second sensor. The last component is then used as the true external noise alone reference and the linear combiner can be optimized for noise cancellation training. Under those conditions, a true FEXT-free environment is achieved as the main victim line is FEXT free due to its presence in a vectored system:

$$Y_m[q,t]=H_m[q]\times[q,t]+W_m[q,t]$$

Once the second sensor is free of self-FEXT, the noise canceller undergoes a learning process in order to optimize the noise canceller to mitigate the one or more alien disturbers. Upon completion of the learning process by the noise canceller, the removal of self-FEXT from the second sensor receive path is stopped. Specifically, when the linear combiner coefficient F has been learned, the received signal during data mode is represented by the following:

$$\tilde{X}[q,t]=F_m Y_m[q,t]+F_s Y_s[q,t]=X[q,t]+F_s S_s[q,t]+\tilde{W}.$$

The self-FEXT experienced by the second sensor is thus folded into the main, victim line. This folded self-FEXT now present on the victim line is mitigated according to the same self-FEXT mitigation operator used earlier to mitigate self-FEXT on the main, victim line.

The receive signal from the noise canceller thus experiences self-FEXT as the vectored system only compensates for self-FEXT originally sensed on the main line. In this regard, self-FEXT from the second sensor is now "folded" into the main line. This folded self-FEXT on the main line is then readily removed or compensated for in the vectored system by simply readjusting the self-FEXT canceller (e.g., precoder or upstream canceller) and utilizing the error estimated after the use of the alien noise canceller. Note that while embodiments herein are described in the context of the customer premises equipment (CPE), the embodiments can be expanded and implemented at the central office (CO) as well.

It should be emphasized that the technique described above can also be expanded to diversity receivers, which utilize more than one communication channel with different channel characteristics to receive information related to the transmitted signal on the victim line, which will be referred to herein as transmit information or useful information. In fact in VDSL systems, the transmit information sent over a twisted pair generally leaks through other channels such as, for example, an adjacent twisted pair of the same bundle through the FEXT channel or in common mode. It is also possible to transmit information on the common mode channel of the differential mode line under certain power constraints. In both cases, the far end transmit information can be received on a second sensor, and the folding of this useful information from the second sensor into the main line can be leveraged with a linear combiner and thus increase the SNR of the system. In a diversity receiver embodiment utilizing a second sensor, the far end transmitted signal received by the second sensor in the frequency domain for tone q for a DMT symbol t after undergoing an FFT operation is represented by the following:

$$Y_m[q,t]=H_m[q]\times[q,t]+S_s+W_m[q,t].$$

As a vectoring system is being used, the second sensor is also subject to self-FEXT. Because the self-FEXT component can be powerful, the linear combiner used at the receiver in the frequency domain cannot be trained as the training will be biased by the self-FEXT. As with the other embodiments described earlier in the context of an alien noise canceller, self-FEXT can be first removed from the second sensor at the receiver after learning locally the self-FEXT canceller during known symbols with the knowledge of the orthogonal key. The combiner then undergoes a learning phase in an optimal manner as it is no longer biased by the self-FEXT from the second sensor. Thus, for a diversity receiver embodiment, the linear combiner coefficient F is learned in a self-FEXT free environment:

$$Y_m[q,t]=H_m[q]\times[q,t]+W_m[q,t]$$

$$\tilde{Y}_s[q,t]=Y_s[q,t]-\tilde{S}_s=H_s[q]\times[q,t]+W_s[q,t]$$

The component $\tilde{S}$ is once again estimated as it is estimated in a vectoring system locally during the transmission of sync symbols or any other orthogonal training sequence. After the coefficient F has been learned, the received signal during data mode is:

$$\tilde{X}[q,t]=F_m Y_m[q,t]+F_s Y_s[q,t]=X[q,t]+F_s S_s[q,t]+\tilde{W},$$

where the self-FEXT from the second sensor is again folded into the main, victim line. This folded self-FEXT is then mitigated using the same mitigation operator used for the main line (e.g., vectoring downstream precoder or an upstream canceller). When the linear combiner is applied, the self-FEXT is folded into the main line from the second sensor. The vectored system then adapts to the folded self-FEXT such that the folded self-FEXT is removed or compensated for on the main line.

By implementing the various dual sensor configurations described herein, the DSR 310 (in FIG. 3) is able to reduce any residual external noise resulting from such sources as radio frequency interference (RFI) and power line communications (PLC) after the removal of self-FEXT. The mixed combination of the information received on the second sensor related to external noise and useful information need to also be taken into consideration. In that scenario, the DSR can be trained to minimize the impact of the noise while simultaneously maximizing the folding of the useful signal/information.

Figure 5:
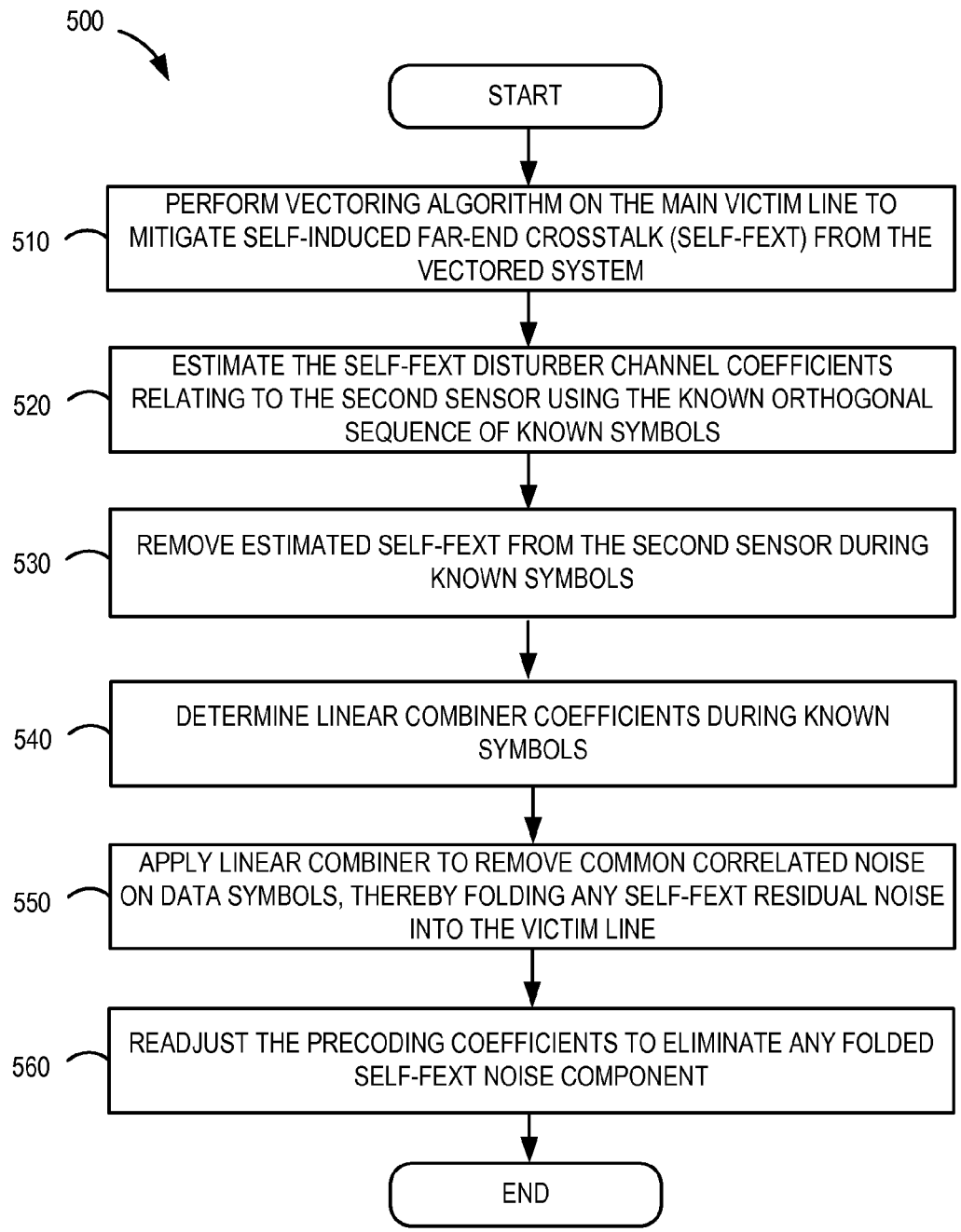
FIG. 5 is a flowchart in accordance with one embodiment for mitigating alien noise or combining diverse received information using a dual sensor configuration.

In accordance with an embodiment for the alien noise mitigation and the diversity receiver based on a dual sensor configuration, a method implemented in a communication system for reducing noise experienced and SNR gain by a victim line is now described in connection with FIG. 5. Although the flowchart 500 of FIG. 5 shows a specific order of execution, it is understood that the order of execution may differ from that which is depicted. In block 510 the vectoring system runs its algorithms in order to eliminate any self-FEXT contribution from the main victim line. The introduction of the second sensor, carrying information about a residual external noise and/or the useful information is made. Self-FEXT noise also appears on the second sensor and may affect the performance of the DSR receiver. In block 520, the self-FEXT coupling coefficients of the second sensor are learned during known symbols based on the knowledge of the transmitted information on the disturber lines (i.e., known symbol) and the orthogonal sequences. Other techniques could also be used to estimate the self-FEXT couplings.

After a learning phase, in block 530, the estimated self-FEXT on each known symbol is removed from the second sensor received signal. In block 540, the linear combiner is learned in a self-FEXT free environment. After the learning phase of the linear combiner, the linear combiner is applied (block 550) during data mode symbol and self-FEXT from the second sensor is folded into the main victim. In order to compensate for this residual component of self-FEXT, the vectoring algorithm is readjusted in block 560.

It should be emphasized that the re-adjustment of the self-FEXT mitigation coefficients in block 560 is predictable as the folded noise is directly related to the self-FEXT canceller coefficients used to remove the self-FEXT from the second sensor during the known symbol and the linear combiner coefficients. Thus, a fast update of the self-FEXT mitigation coefficients based on those previous primitives (e.g., linear combiner coefficients, self-FEXT mitigation coefficients) can be achieved. For self-FEXT mitigation in the downstream direction, the useful information can also be transmitted to the CO through proprietary fields. Finally, note that the linear combiner learned in a self-FEXT free environment utilizes the useful information received on the second sensor when no external noise is present (as in a diversity receiver scenario).

The embodiment described in connection with the flowchart 500 of FIG. 5 relates to a vectored system. The stages outlined can be all performed locally at the receiver (e.g., an upstream receiver located at the CO side). In the context of the downstream channel, the vectored self-FEXT mitigation task will be performed at the CO side via, for example, a precoder technique. The local mitigation of the self-FEXT on the second sensor and the learning of the linear combiner as well as application of the linear combiner will be performed at the CPE receiver.

If embodied in software, each block depicted in FIG. 5 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the CPE 110 shown in FIG. 2. The machine code may be converted from the source code, etc. If embodied in hardware, each block may represent a circuit or a number of interconnected circuits to implement the specified logical function(s). The technique leverages the fact that exact knowledge of FEXT coupling can generally be used to improve performance and predictability of the performance gain. Precise identification of the crosstalk channel on both the main line and second sensor line can be derived by means of cross-correlation of aligned orthogonal sequences assigned to downstream known symbol sequences, as with dynamic spectrum management level 3 (DSM3). Note that the use of a perfectly orthogonal set of known symbol sequences allows one to determine and regularly update self-FEXT mitigation coefficients to cancel the identified dominant (or non-dominant) crosstalk source in a manner similar to an upstream DSM3 crosstalk canceller. This addresses the imperfect correlation problem identified for other dual sensor approaches.

Figure 6:
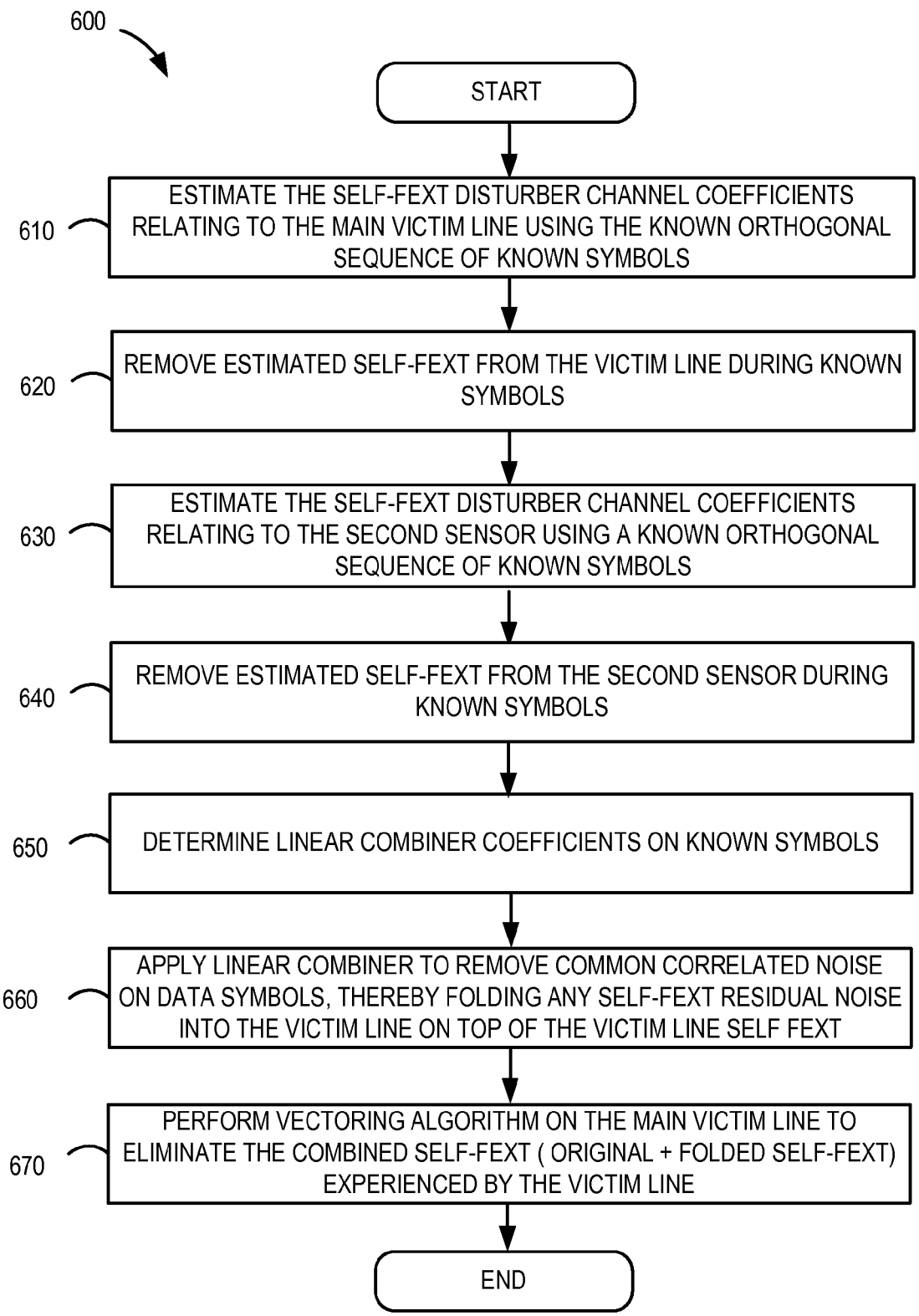
FIG. 6 is a flowchart in accordance with another embodiment for mitigating alien noise or combining diverse received information using a dual sensor configuration.

In accordance with alternative embodiments, DSR training may occur prior to DSM3 self-FEXT noise mitigation. Reference is made to FIG. 6. Although the flowchart 600 of FIG. 6 shows a specific order of execution, it is understood that the order of execution may differ from that which is depicted. In a non-DSM3 environment, self-FEXT disturber channel coefficients are estimated locally at the CPE 110c using a known orthogonal sequence of known symbols (block 610) for the main victim line. In block 620, the self-FEXT disturber is removed from the victim line on known symbols using known orthogonal sequences and the estimated channel coefficients. In block 630, the self-FEXT disturber channel coefficients relating to the second sensor are estimated at the receiver, using a known orthogonal sequence of known symbols. The self-FEXT contribution is thus removed from the second sensor (block 640). In block 650, the training of the linear combiner is completed during the known symbol period as the transmit disturber information is known by the receiver. In block 660, the linear combiner is applied to remove common correlated noise on data symbols or to fold constructively useful information into the main line, and thereby folding any self-FEXT residual noise into the victim line. In block 670, DSM3 coefficients are determined to reduce the folded self-FEXT as well as the original self-FEXT experienced by the victim line.

It again should be emphasized that the learning of the self-FEXT mitigation coefficients is predictable as the folded noise is directly related to the self-FEXT canceller coefficients used to remove the self-FEXT from the second sensor during the known symbol and the linear combiner coefficients. Thus, a fast update of the self-FEXT mitigation coefficients based on those previous primitives (e.g., linear combiner coefficients, self-FEXT mitigation coefficients) can be achieved. For self-FEXT mitigation in the downstream direction, the useful information can also be transmitted to the CO through proprietary fields. Finally, note that the linear combiner learned in a self-FEXT free environment utilizes the useful information received on the second sensor when no external noise is present (as in a diversity receiver scenario).

Figure 7:
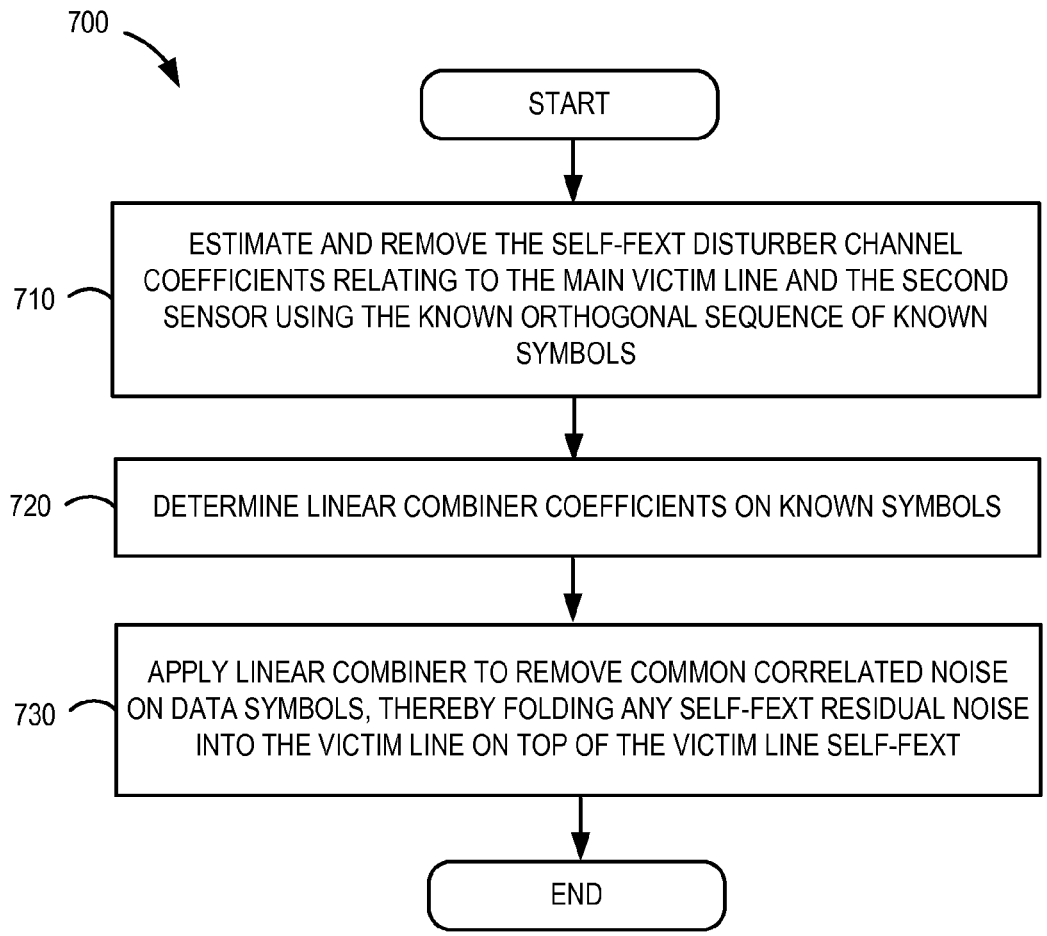
FIG. 7 is a flowchart in accordance with another embodiment for mitigating alien noise or combining diverse received information using a dual sensor configuration.

In accordance with other embodiments, DSR training may be performed to reduce the impact of an external disturber, which is greater than the self-FEXT experienced by the main, victim line but less powerful than the self-FEXT experienced by the second sensor. For such scenarios, a DSM3 noise mitigation module is not required. Reference is made to FIG. 7. Although the flowchart 700 of FIG. 7 shows a specific order of execution, it is understood that the order of execution may differ from that which is depicted. Self-FEXT disturber channel coefficients are estimated locally at the CPE 110c using the known orthogonal sequence during known symbols (block 710) for the main victim line and the second sensor (block 710). The self-FEXT disturber is removed from the victim line and the second sensor on known symbols, and the linear combiner is trained in this self-FEXT free environment (block 720). The linear combiner is then applied to remove common correlated noise on data symbols or to fold constructively useful information into the main line (block 730) and thereby adding into the main, victim line any self-FEXT residual noise from the second sensor. Note that this is useful in its current form only if the effect of the folded self-FEXT from the second sensor is still less than the current canceled external noise. Once the external noise is cancelled, the performance of the victim line is limited by self-FEXT noise, which may be mitigated using vectoring techniques. Note also that the linear combiner learned during the self-FEXT free environment utilizes the useful information received on the second sensor when no external noise is present (as in a diversity receiver scenario).

The embodiment described in connection with FIG. 7 can be extended to the case where the DSR is used without any self-FEXT mitigation technique being applied and with no external noise present. In such cases, a first group composed of the most dominant self-FEXT disturber (or a set of the most dominant self-FEXT disturbers) can be considered equivalent to external noise (such as the external noise described earlier) and thus be mitigated with an alien noise canceller. During the training period of the linear combiner on known symbols, the receiver estimates and then removes the second group of self-FEXT composed of the non-dominant self-FEXT noise from the main line and the second sensor. After the compensation phase, the linear combiner can be learned such that the linear combiner only mitigates the first group of dominant self-FEXT disturbances. After the learning phase, the linear combiner is applied to the data symbol, and performance is driven by the folding of the (unmitigated) second group of self-FEXT into the main victim line.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a vectored system for improving a signal-to-noise ratio (SNR) of a far end transmitted signal on a victim line in the system, comprising:

mitigating, by the vectored system, self-induced far-end crosstalk (self-FEXT) on the victim line based on self-FEXT mitigation coefficients;

receiving, by a second sensor, information relating to a noise source comprising at least one of: self-FEXT of the vectored system, external noise, and the far end transmitted signal, wherein the second sensor is configured to receive the information relating to the noise source exclusive of any useful signals in the system;

learning, at the second sensor, coefficients relating to self-FEXT coupling into the second sensor;

removing self-FEXT from the second sensor based on the learned coefficients;

upon removal of self-FEXT from the second sensor, learning a linear combiner configured to combine information relating to the victim line and the noise source;

applying the learned linear combiner; and readjusting the self-FEXT mitigation coefficients to remove any residual self-FEXT on the victim line after application of the learned linear combiner.

2. The method of claim 1, wherein learning a linear combiner is performed according to one of the following criteria: minimum mean square error, zero forcing, and maximum likelihood (ML).

3. The method of claim 1, wherein learning coefficients relating to self-FEXT coupling into the second sensor is performed according to a known sequence transmitted on one or more disturber lines causing the self-FEXT into the victim line.

4. The method of claim 3, wherein learning coefficients relating to self-FEXT coupling into the second sensor is further performed using one or more orthogonal sequences.

5. The method of claim 1, wherein learning coefficients relating to self-FEXT coupling into the second sensor is performed during transmission of data mode symbols.

6. The method of claim 1, wherein receiving information relating to the vectored system comprises receiving information relating to external noise composed of at least one of: non-vectored very high-speed digital subscriber line (VDSL) FEXT, radio frequency interference (RFI), power line communications (PLC), common mode noise, and impulse noise.

7. The method of claim 1, wherein applying the learned linear combiner comprises mitigating external noise if the information received by the second sensor relates to the external noise.

8. The method of claim 1, wherein applying the learned linear combiner comprises constructively folding the far end transmitted signal from the second sensor into the victim line if the information received by the second sensor relates to the far end transmitted signal.

9. The method of claim 1, wherein applying the learned linear combiner comprises constructively folding the far end transmitted signal from the second sensor into the victim line and mitigating external noise if the information received by the second sensor relates to both the far end transmitted signal and the external noise.

10. The method of claim 1, wherein the linear combiner operates according to one or two coefficients per tone.

11. The method of claim 1, wherein readjusting the self-FEXT mitigation coefficients is performed based on previously-learned self-FEXT mitigation coefficients or another initial state of the self-FEXT mitigation coefficients.

12. A method for improving a signal-to-noise ratio (SNR) of a far end transmitted signal on a victim line in a system, comprising:
  receiving, by the victim line, at least one of: self-induced far-end crosstalk (self-FEXT) of the vectored system, external noise, and the far end transmitted signal;
  receiving, by a second sensor, a noise signal comprising at least one of: self-FEXT of the vectored system, external noise, and the far end transmitted signal, wherein the second sensor is configured to receive the noise signal exclusive of any useful signals in the system;
  learning, at the victim line, coefficients relating to self-FEXT coupling into the victim line, wherein learning is performed based on known training mode sequences transmitted in the system;
  learning, at the second sensor, coefficients relating to self-FEXT coupling into the second sensor, wherein learning is performed based on known training mode sequences transmitted in the system;
  removing, at the victim line, self-FEXT from the main line based on the learned coefficients;
  removing, at the second sensor, self-FEXT from the second sensor based on the learned coefficients;
  learning a linear combiner upon removing self-FEXT from both the main line and the second sensor, the linear combiner configured to combine information relating to the victim line and the second sensor;
  applying the learned linear combiner; and
  learning the self FEXT mitigation coefficients and performing noise mitigation on the victim line to remove self-FEXT on the victim line.

13. A vectored system configured to improve a signal-to-noise ratio (SNR) of a far end transmitted signal on a victim line, comprising:
  a far end crosstalk (FEXT) mitigator configured to mitigate self-induced far-end crosstalk (self-FEXT) on the victim line based on self-FEXT mitigation coefficients;
  a first sensor coupled to the victim line;
  a second sensor, the second sensor configured to receive information relating to a noise source comprising at least to one of: the vectored system, external noise, and the far end transmitted signal on the victim line, wherein the second sensor is configured to receive the information relating to the noise source exclusive of any useful signals in the system;
  the second sensor further configured to learn coefficients relating to self-FEXT coupling into the second sensor and remove self-FEXT based on the learned coefficients; and
  a linear combiner configured to undergo learning upon removal of self-FEXT from the second sensor, wherein the linear combiner is configured to combine information relating to the victim line and the noise source;
  wherein the FEXT mitigator is further configured to readjust the self-FEXT mitigation coefficients to remove any residual self-FEXT on the victim line after application of the learned linear combiner.

14. The system of claim 13, wherein the second sensor is configured to operate according to a differential mode involving another twisted pair in the system or a common mode based on the victim line.

15. The system of claim 13, wherein learning a linear combiner is performed according to one of the following criteria: minimum mean square error, zero forcing, and maximum likelihood (ML).

16. The system of claim 13, wherein information relating external noise comprises one or more of: non-vectored very high-speed digital subscriber line (VDSL) FEXT, radio frequency interference (RFI), power line communications (PLC), common mode noise, and impulse noise.

17. The system of claim 13, wherein the learned linear combiner mitigates external noise if the information received by the second sensor relates to the external noise.

18. The system of claim 13, wherein the learned linear combiner constructively folds the far end transmitted signal from the second sensor into the victim line if the information received by the second sensor relates to the far end transmitted signal.

19. The system of claim 13, wherein the learned linear combiner constructively folds the far end transmitted signal from the second sensor into the victim line and mitigates external noise if the information received by the second sensor relates to both the far end transmitted signal and the external noise.

20. The system of claim 13, wherein the linear combiner operates according to one or two coefficients per tone.

21. The system of claim 13, wherein the FEXT mitigator readjusts the self-FEXT mitigation coefficients based on previously-learned self-FEXT mitigation coefficients or an initial state of the self-FEXT mitigation coefficients.

22. A method implemented in customer premises equipment (CPE) for improving a signal-to-noise ratio (SNR) of a far end transmitted signal on a victim line, comprising:
  receiving, by the victim line, one or more of: the far end transmitted signal, self-induced far-end crosstalk (self-FEXT) of a vectored system, and external noise;
  receiving, by a second sensor, information relating to a noise source comprising one or more of: the far end transmitted signal, self-induced far-end crosstalk (self-FEXT) of a vectored system, and external noise, wherein the second sensor is configured to receive the information relating to the noise source exclusive of any useful signals in the system;
  based on the presence of self-FEXT, learning, at the victim line, coefficients relating to self-FEXT coupling into the victim line;
  learning, at the second sensor, coefficients relating to self-FEXT coupling into the second sensor;
  responsive to the presence of self-FEXT, removing self-FEXT from the victim line based on the learned coefficients;
  removing self-FEXT from the second sensor based on the learned coefficients;
  upon removal of self-FEXT from the second sensor, learning a linear combiner configured to combine information relating to the victim line and the noise source; and applying the learned linear combiner.

23. The method of claim 22, wherein learning a linear combiner is performed according to one of the following criteria: minimum mean square error, zero forcing, and maximum likelihood (ML).

24. The method of claim 22, wherein learning coefficients relating to self-FEXT coupling into the victim line and the second sensor is performed according to a known sequence transmitted on one or more disturber lines causing the self-FEXT into the victim line.

25. The method of claim 24, wherein learning coefficients relating to self-FEXT coupling into the victim line and the second sensor is further performed using one or more orthogonal sequences.

26. The method of claim 22, wherein learning coefficients relating to self-FEXT coupling into the victim line and the second sensor is performed during transmission of data mode symbols.

27. The method of claim 22, wherein receiving information relating to the vectored system comprises receiving information relating to external noise composed of one or more of: non-vectored very high-speed digital subscriber line (VDSL) FEXT, radio frequency interference (RFI), power line communications (PLC), common mode noise, and impulse noise.

28. The method of claim 22, wherein applying the learned linear combiner comprises mitigating external noise if the information received by the second sensor relates to the external noise.

29. The method of claim 22, wherein applying the learned linear combiner comprises constructively folding the far end transmitted signal from the second sensor into the victim line if the information received by the second sensor relates to the far end transmitted signal.

30. The method of claim 22, wherein applying the learned linear combiner comprises constructively folding the far end transmitted signal from the second sensor into the victim line and mitigating external noise if the information received by the second sensor relates to both the far end transmitted signal and the external noise.

31. The method of claim 22, wherein the linear combiner operates according to one or two coefficients per tone.

32. A customer premises equipment (CPE) unit in a vectored system for improving a signal-to-noise ratio (SNR) of a far end transmitted signal on a victim line, comprising:
  a first sensor coupled to the victim line, the first sensor configured to learn coefficients relating to self-induced far-end crosstalk (self-FEXT) coupling into the first sensor and remove self-FEXT based on the learned coefficients;
  a second sensor configured to receive information relating to a noise source comprising at least one of: the vectored system, external noise, and the far end transmitted signal on the victim line, the second sensor further configured to learn coefficients relating to self-FEXT coupling into the second sensor and remove self-FEXT based on the learned coefficients, and wherein the second sensor is configured to receive the information relating to the noise source exclusive of any useful signals in the system; and
  a linear combiner configured to undergo learning upon removal of self-FEXT from the first and the second sensor, wherein the linear combiner is configured to combine information relating to the victim line and the noise source.

33. The CPE of claim 32, wherein the second sensor is configured to operate according to a differential mode involving another twisted pair in the system or a common mode based on the victim line.

34. The CPE of claim 32, wherein the linear combiner undergoes learning according to one of the following criteria: minimum mean square error, zero forcing, and maximum likelihood (ML).

35. The CPE of claim 32, wherein the information received by the second sensor relating to external noise comprises of one or more of: non-vectored very high-speed digital subscriber line (VDSL) FEXT, radio frequency interference (RFI), power line communications (PLC), common mode noise, and impulse noise.

36. The CPE of claim 32, wherein the learned linear combiner mitigates external noise if the information received by the second sensor relates to the external noise.

37. The CPE of claim 32, wherein the learned linear combiner constructively folds the far end transmitted signal from the second sensor into the victim line if the information received by the second sensor relates to the far end transmitted signal.

38. The CPE of claim 32, wherein the learned linear combiner constructively folds the far end transmitted signal from the second sensor into the victim line and mitigates external noise if the information received by the second sensor relates to both the far end transmitted signal and the external noise.

39. The CPE of claim 32, wherein the linear combiner comprises one or two coefficients per tone.

40. The method of claim 1, wherein the second sensor comprises a differential mode sensor coupled to an unused line in a same bundle as the victim line in the system.

41. The method of claim 1, wherein the second sensor comprises a common mode sensor coupled between a twisted pair comprising the victim line and ground.

* * * * *